No. 771,744.

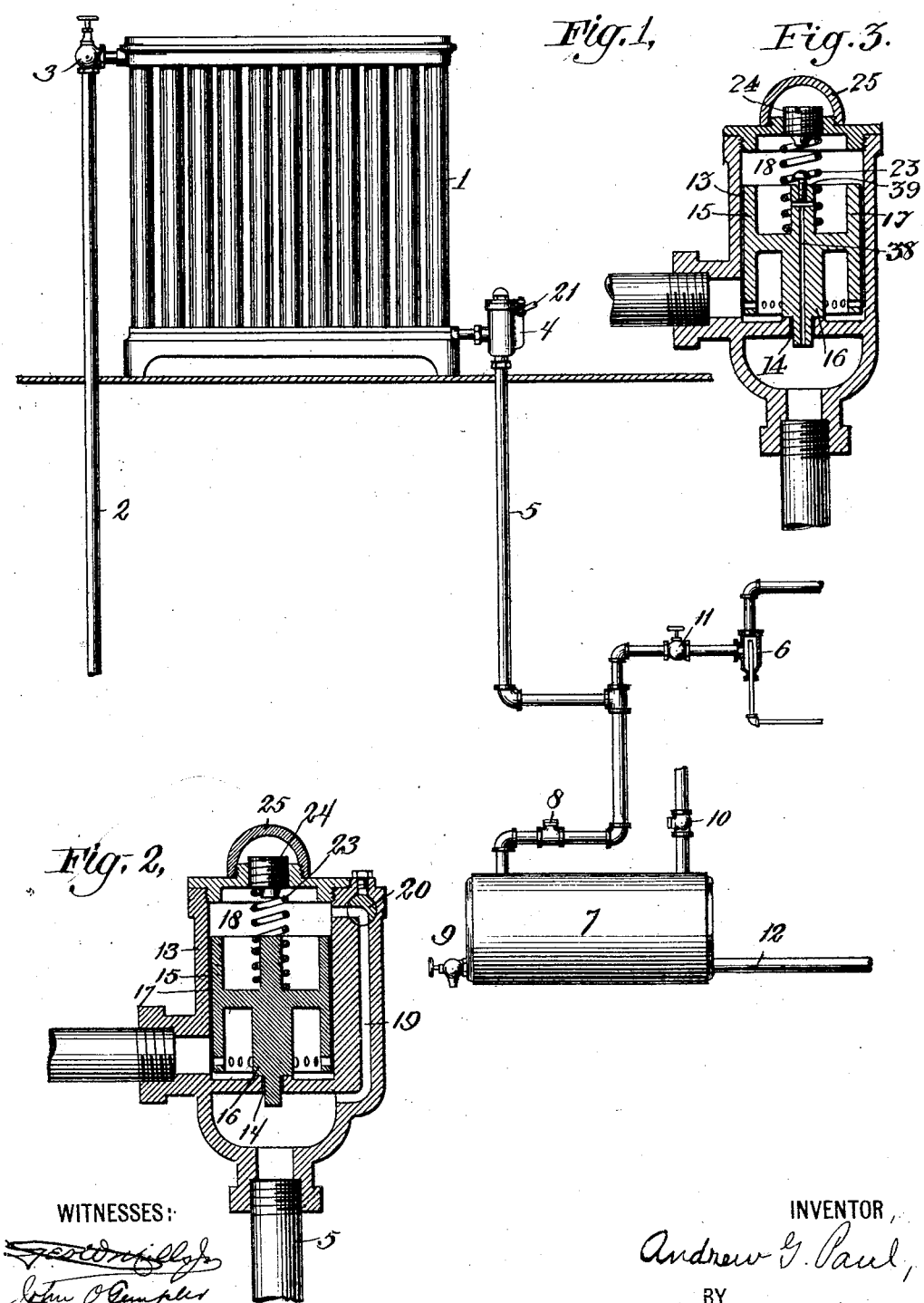

Patented October 4, 1904.

UNITED STATES PATENT OFFICE.

ANDREW G. PAUL, OF BOSTON, MASSACHUSETTS.

HEATING SYSTEM AND VALVE FOR USE THEREIN.

SPECIFICATION forming part of Letters Patent No. 771,744, dated October 4, 1904.

Application filed May 15, 1900. Renewed November 30, 1903. Serial No. 183,293. (No model.)

*To all whom it may concern:*

Be it known that I, ANDREW G. PAUL, a citizen of the United States, residing in Boston, in the county of Suffolk and State of Massachusetts, have invented a new and useful Improvement in Heating Systems and Valves for Use Therein, of which the following is a full, clear, and exact specification, reference being had to the accompanying drawings, which form a part hereof.

This invention relates to a heating system wherein steam or other suitable heating agent is circulated for the purpose of conveying and imparting heat to the places desired; and it consists in an improved construction and arrangement of the parts of such a system.

The object of my invention is to control the discharge of the air and the water of condensation from the radiator and at the same time to prevent the loss or waste of the heating vehicle through the discharge-pipe.

My invention consists, first, in the combination, in a heating system, of a supply-pipe, a heater or radiator, and a discharge-pipe, and a valve device in the discharge-pipe having a suitable valve-casing provided with a port for the discharge of the water, and a piston or fluid-pressure motor controlling said port, the valve-casing being provided with a fluid-pressure chamber on one side of said motor, and a passage for air or gas or vapor connecting the fluid-pressure chamber with the system on the inlet side of said motor and adapted to be controlled by the collection of the water of condensation. In the best form of my invention a piston is employed, and it is made a little smaller than the valve-casing, so as to leave between the piston and the wall of the casing a sufficient passage for the escape of the air or gas, and a spring is caused to bear against one end of the piston so as to cause the piston to close the discharge-port for the water, and means are provided to regulate the tension of this spring.

My invention also consists in providing a passage connecting the fluid-pressure chamber with the discharge-pipe at a point on the discharge side of the discharge-port for the water.

My invention also consists in the combination, in a heating system, of a radiating device, a discharge-pipe, a valve interposed between the outlet of the radiating device and the discharge-pipe, a fluid-pressure motor for operating said valve, the opposite sides of which are acted upon respectively by the pressure in the radiator-outlet and the pressure in the discharge-pipe, the pressure on the outer side of the said motor being controlled by the conditions on the inlet side of the valve—as, for example, by the collection of water of condensation at that point.

My invention also consists in a valve device for heating systems embracing a valve-casing provided with a port, a valve-piece adapted to control said port, a pressure-motor for operating said valve-piece by a differential pressure on the inlet and outlet sides of the valve, said valve device being provided with a communication between said inlet and outlet sides adapted to be sealed or controlled by an accumulation of water within the valve-body, whereby a differential pressure will be produced on the motor, so as to move the valve-piece and open or close the valve.

My invention also consists in other features of construction and combinations of parts hereinafter described and claimed.

My invention is fully shown in the accompanying drawings, in which—

Figure 1 shows one form of system with my improved discharge-valve on the discharge-pipe. Fig. 2 is a sectional view showing the construction of said discharge-valve. Fig. 3 is a sectional view showing another form of modification of my improved discharge-valve.

Similar numbers denote similar parts in the different figures.

Referring to Fig. 1, 1 is a heater or radiator. 2 is a supply-pipe provided with any suitable form of supply-valve 3. 4 is a valve device on the discharge-pipe. 5 is the return or discharge pipe. 6 is an exhauster in the form of a steam-jet connected with the discharge-pipe, as shown. 7 is a tank or reservoir to receive the water of condensation. 8 is a check-valve placed in the discharge-pipe above the tank or reservoir. 9 is a cock to draw the water from the reservoir whenever desired. 10 is a check-valve opening outward, so that if there is any pressure in the tank 7 it may blow out through this pipe. 11 is an ordinary valve by means of which the exhauster may be cut out of operation. 12 is a pipe leading from the tank or reservoir, through which the water may be pumped to the boiler or to any other point desired.

The construction of the discharge-valve is shown in Fig. 2. 13 is the valve-casing. This valve-casing is provided with a port 14 at its lower end for the discharge of the water. 15 is a piston or pressure-motor adapted to move up and down in said casing and provided at its lower end with a valve 16, adapted to close the port 14. The piston 15 is made slightly smaller than the interior of casing 13, so as to form or leave a passage 17 for air or gas or even a small quantity of vapor between the piston and the wall of the casing. 18 is a fluid-pressure chamber above the piston. The passage 17 connects the fluid-pressure chamber 18 with the lower portion of the casing below the piston. 19 is a passage in the casing connecting the fluid-pressure chamber with the discharge-pipe 5 beyond the valve device. In the particular form of discharge-valve shown this passage 19 opens into a chamber in the lower part of the casing, which is on the discharge side of the water-discharge port. 20 is a two-way valve in the passage 19, which is provided with the handle 21. (See Fig. 1.) By turning the cock 20 the passage 19 can be connected with the fluid-pressure chamber 18 or cut off from said fluid-pressure chamber. 23 is a spring, one end of which bears against the upper side of the piston and the other end of which bears against the lower surface of a screw 24. The screw 24 is provided with a screw-thread taking in a screw-thread in the upper part of the casing. By screwing the screw 24 in or out the tension of the spring 23 can be varied and adjusted. 25 is a cap adapted to be screwed onto the top of the casing, as shown, and to cover and protect the screw 24.

The operation of this form of my invention is as follows: When any air or gas collects in the pipe leading from the radiator to the discharge-valve, it is drawn out by the operation of the exhauster through the passage 17, the fluid-pressure chamber 18, and the pipe or passage 19 and the discharge-pipe 5 without causing any motion of the piston 15. When, however, any substantial quantity of water collects in the lower part of the valve device, this water operates to seal the passage 17, as a result of which the exhauster produces a minus pressure or vacuum in the fluid-pressure chamber 18, which causes the piston 15 to be lifted, thereby opening the water-discharge port 14 and causing the discharge of the water or of water together with air or gas. As soon as the water has been discharged the piston again closes. This operation is repeated from time to time, air or gas and water being discharged intermittently, as already described. At the same time no substantial quantity of steam is permitted to escape around the piston 15. By shutting off the pipe 19 by means of the cock 20 the discharge-valve will be closed and kept closed, so that neither air nor gas nor water will be drawn out from the system. It will be seen, therefore, that in the construction just explained there is a return for the air and water of condensation leading from the radiator and a valve interposed between the outlet of the radiating device and the return and a pressure-motor for operating said valve interposed between the valve and the outlet of the radiating device and that the opposite sides of this motor are acted upon respectively by the pressure in the radiator-outlet and in the return and that the pressure on the outer side of said motor—that is to say, the side away from the radiator-outlet—is controlled by the conditions on the inlet side of the valve, the controlling condition in the particular case in question being the accumulation of the water of condensation.

In Fig. 3 a modification of the discharge-valve is shown in which the passage connecting the fluid-pressure chamber with the discharge-pipe is formed in the middle of the piston itself (see 38) instead of being formed in the side of the casing, as in the form shown in Fig. 2. 39 is a screw in the upper part of the piston, by means of which the size of the passage 38 can be varied or regulated.

In the particular form of piston illustrated in Fig. 1 an exhauster 6 is shown connected with the discharge-pipe 5. It is not necessary, however, to use an exhauster, inasmuch as the discharge-valve will operate with a pressure system—that is to say, when there is atmospheric pressure in the discharge-pipe and a pressure in excess of atmospheric in the radiator. In such a case when the passage 17 is sealed by the accumulation of the water of condensation a differential pressure is produced on opposite sides of the piston 15, by reason of which the piston is raised and the valve is opened, causing the discharge of the water or of water together with air and gas. As soon as the water has been discharged the piston again closes.

I do not claim in this present application the combination of an exhausting device with the other parts of the system herein shown and described, as I have reserved such claims for a separate application, which I intend to file as a division of the present case.

Some of the advantages secured by my improved system are as follows: The water and air or gas are intermittently and positively removed from the radiator or heater whenever they collect in any considerable quantity at the discharge-valve. This is done not only efficiently, but economically. The construction of the discharge-valve is simple and not liable to get out of order.

What I claim as new, and desire to secure by Letters Patent, is—

1. In a heating system, the combination of a supply-pipe, a heater or radiator, a discharge-pipe, a valve device in said discharge-pipe having a suitable valve-casing, provided with a port for the discharge of the water, a fluid-pressure motor controlling said port, the valve-casing being provided with a fluid-pressure chamber on one side of said motor, a passage connecting the fluid-pressure chamber with the system on the inlet side of said motor and adapted to be controlled by the collection of the water of condensation, substantially as set forth.

2. In a heating system, the combination of a supply-pipe, a heater or radiator, a discharge-pipe, a valve device in said discharge-pipe having a suitable valve-casing provided with a port for the discharge of the water, a piston controlling said port, the valve-casing being provided with a fluid-pressure chamber above said piston, the valve device being provided with a passage between the piston and the wall of the casing adapted to be sealed by an accumulation of water of condensation, substantially as set forth.

3. A discharge-valve for a heating system consisting of a valve-casing provided with a discharge-port for the water of condensation, a fluid-pressure motor controlling said discharge-port, the valve-casing being provided with a fluid-pressure chamber on the other side of said motor from the discharge-port, and with a second chamber on the nearer side of said motor, the valve being provided with a passage connecting the chambers on the opposite sides of said motor and adapted to be controlled by the collection of water of condensation, and a passage connecting the fluid-pressure chamber with the chamber of the valve beyond the discharge-port for the water, substantially as set forth.

4. A valve device for heating systems embracing a valve-casing provided with a port, a valve-piece adapted to control said port, a pressure-motor for operating said valve-piece by a differential pressure on the inlet and outlet sides of the valve, said valve device being provided with a communication between said inlet and outlet sides adapted to be sealed by an accumulation of water within the valve-body whereby a differential pressure will be produced on the motor so as to move the valve-piece, substantially as set forth.

5. An automatic valve device for a heating system embracing a valve-casing having a port, a pressure-motor having one side in communication with the inlet of the valve-casing, a stem carried by said motor and provided with a valve adapted to control the port, said stem and motor being provided with a passage forming a communication between the other side of the motor and the outlet side of the valve-casing, and said valve device having a communication between the opposite sides of the pressure-motor adapted to be sealed by an accumulation of water, substantially as set forth.

6. In a heating system, the combination of a radiating device, a discharge-pipe, a valve interposed between the outlet of the radiating device and the discharge-pipe, a pressure-motor for operating said valve, having its opposite sides acted upon respectively by the pressures in the radiator-outlet and the discharge-pipe, the pressure on the outer side of said motor being controlled by the conditions on the inlet side of the valve, substantially as set forth.

7. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on the outer side of said motor, the inner side of said motor being exposed to the pressure on the inlet side of the valve device, the valve device being provided with a passage connecting the fluid-pressure chamber with the inlet side of the device, the passage being automatically controlled by the conditions on the inlet side of said device to control the differential pressures acting on the motor, substantially as set forth.

8. In a heating system, the combination of a supply-pipe, a heater or radiator, a discharge-pipe, a valve device in said discharge-pipe having a suitable valve-casing provided with a port for the discharge of the water, a fluid-pressure motor controlling said port, the valve-casing being provided with a fluid-pressure chamber on the outer side of said motor, the inner side of said motor being exposed to the pressure on the inlet side of the valve device, the valve device being provided with a passage connecting the fluid-pressure chamber with the inlet side of the device, the passage being automatically controlled by the accumulation of water of condensation, substantially as set forth.

In testimony whereof I have signed my name to this specification in the presence of two subscribing witnesses.

ANDREW G. PAUL.

Witnesses:
THOMAS K. PETERS,
NANNIE FINLEY.